United States Patent
Lin (10) Patent No.: US 10,603,789 B2
(45) Date of Patent: Mar. 31, 2020

(54) MANUALLY TAUGHT ROBOT AND METHOD FOR MANUALLY TEACHING ROBOT

(71) Applicant: SUZHOU AMTF ROBOTS CO., LTD, Suzhou (CN)

(72) Inventor: Zhongwei Lin, Nanjing (CN)

(73) Assignee: SUZHOU AMTF ROBOTS CO., LTD, Suzhou (CN)

( * ) Notice: Subject to any disclaimer, the term of this patent is extended or adjusted under 35 U.S.C. 154(b) by 306 days.

(21) Appl. No.: 15/569,363

(22) PCT Filed: May 24, 2016

(86) PCT No.: PCT/CN2016/083211
§ 371 (c)(1),
(2) Date: Oct. 25, 2017

(87) PCT Pub. No.: WO2016/188409
PCT Pub. Date: Dec. 1, 2016

(65) Prior Publication Data
US 2018/0304460 A1    Oct. 25, 2018

(30) Foreign Application Priority Data

May 26, 2015  (CN) .......................... 2015 1 0274550
May 26, 2015  (CN) ...................... 2015 2 0347959 U (51) Int. Cl.
*G06F 19/00*  (2018.01)
*B25J 9/16*   (2006.01)
*G05B 19/423* (2006.01)

(52) U.S. Cl.
CPC .............. *B25J 9/163* (2013.01); *B25J 9/161* (2013.01); *B25J 9/1633* (2013.01); *B25J 9/1682* (2013.01); *B25J 9/1692* (2013.01); *G05B 19/423* (2013.01)

(58) Field of Classification Search
CPC . B25J 9/163; B25J 9/161; B25J 9/1633; B25J 9/1682; B25J 9/1692; G05B 19/423
See application file for complete search history.

(56) References Cited

U.S. PATENT DOCUMENTS 8,280,421 B2 * 10/2012 Nanri ................... H04L 1/0001
                                                       455/458
8,626,167 B2 *  1/2014 Futaki .................. H04W 76/28
                                                       455/436

(Continued)

FOREIGN PATENT DOCUMENTS

CN    202825841      3/2013
CN    103425100     12/2013

(Continued)

OTHER PUBLICATIONS

International Search Report for PCT/CN2016/000113.

*Primary Examiner* — Ian Jen
(74) *Attorney, Agent, or Firm* — Garcia-Zamor Intellectual Property Law, LLC; Ruy Garcia-Zamor (57) ABSTRACT

A manually taught robot which may include a main controller, at least one joint comprising two arms and a drive mechanism with a servo motor, a driver, and an encoder. The main controller is electrically connected to the drivers and an output of each encoders. Additionally, a method for manually teaching a robot may include the steps of the robot entering into a torque mode and moving according to a desired track, the main controller storing output values from the encoders, the servo motor resetting into a positional or speed mode controlled by the driver controls and the operational output values of each encoder changing at the end of each operation period.

16 Claims, 4 Drawing Sheets

(56) References Cited

U.S. PATENT DOCUMENTS

| | | | | |
|---|---|---|---|---|
| 8,666,414 B2* | 3/2014 | Aramaki | ........... | H04W 74/0866 |
| | | | | 455/436 |
| 8,787,310 B2* | 7/2014 | Sahara | ................ | H04W 52/322 |
| | | | | 370/329 |
| 8,838,117 B2* | 9/2014 | Soliman | ................ | H04W 36/04 |
| | | | | 370/331 |
| 9,276,810 B2* | 3/2016 | Bi | .......................... | H04B 7/024 |
| 2007/0238463 A1* | 10/2007 | Ogami | .............. | H04W 36/0033 |
| | | | | 455/436 |
| 2009/0186615 A1* | 7/2009 | Kwon | ................... | H04W 36/04 |
| | | | | 455/436 |
| 2014/0379128 A1 | 12/2014 | Ishikawa | | |
| 2015/0319774 A1* | 11/2015 | Cai | ....................... | H04W 72/14 |
| | | | | 370/329 |
| 2016/0044552 A1* | 2/2016 | Heo | ........................ | H04L 5/001 |
| | | | | 370/331 |

FOREIGN PATENT DOCUMENTS

| | | |
|---|---|---|
| CN | 104162890 | 11/2014 |
| CN | 104635714 | 5/2015 |
| CN | 204673697 | 9/2015 |
| CN | 104959983 | 10/2015 |
| CN | 105127976 | 12/2015 |
| CN | 204997661 | 1/2016 |
| JP | 2001113481 | 4/2001 |

* cited by examiner

MANUALLY TAUGHT ROBOT AND METHOD FOR MANUALLY TEACHING ROBOT

CROSS REFERENCE TO RELATED APPLICATIONS

This application claims priority to the following Patent Application: (1) PCT application PCT/CN2016/083211, entitled "MANUALLY TAUGHT ROBOT AND METHOD FOR MANUALLY TEACHING ROBOT" filed 24 May 2016; (2) Chinese patent application CN 201520347959.2, filed 26 May 2015; (3) Chinese patent application CN 201510274550.7, filed 26 May 2015; the above-identified applications are hereby incorporated by reference in its entirety as if fully set forth herein.

BACKGROUND

1. Technical Field

The invention relates to a robot and a teaching method thereof.

2. Description of Related Art

In view of rapid, changeable and ever-increasing requirements of modern industry, robots are not only required to "work tirelessly", but also can be used as a highly flexible, open, programmable, and reconfigurable manufacturing unit with a friendly human-computer interaction function to integrate into the manufacturing industry system in production units applied for future industry, following flexible manufacturing, computer integrated manufacturing, sophisticated production and parallel engineering. The realization of this capability requires the overall progress of robot technologies at this stage, in which a teaching technology is the important one. The robot is deemed as flexible automation equipment because it can be programmed to perform different tasks. A process of programming the assignment task of the robot through certain equipment or way is the process of teaching robot.

There are two major conventional teaching methods, one is to teach through teaching instructors; the other is, through the offline software, to generate a track file to operate the robot, then the robot operates in accordance with the data of the track file. The former is used for the track operation of general rule sets, such as a straight line, arc, etc., while the later can realize not only the teaching of the straight line, arc or the like, but also the complex teaching of curves. It is, however, more complex to use the offline software, has higher demand for the operator, as well as has high workload of on-site digital-analogy collection; furthermore, the price of the software is very high, affecting the promotion and application of the robot.

SUMMARY

The present invention aims at providing a method for manually teaching a robot, by which the robot can record a teaching track in which an operator moves the robot by hand and causes the robot to move in accordance with an operator's intention, and the robot can, in accordance with the recorded teaching track to operate; the method does not need to be programmed for the operator, and the teaching track can be any one, without any requirement to the operator, so that the use cost of the robot is greatly reduced; the parts used in the method belong to the conventional parts, which has low manufacturing cost.

A method for manually teaching a robot is disclosed in the present invention, the robot comprises a main controller and at least one joint; the joint comprises two arms, a drive mechanism for driving the two arms to move relatively, the drive mechanism comprises a servo motor, a driver electrically connected to the drivers to control the servo motor, and an encoder; the main controller is electrically connected with each of the drivers, and an output of each of the encoders is connected to the main controller;

The method for manually teaching the robot comprises the following steps of:
a. learning step:
a1. each of the servo motors being in a torque mode via each of the drivers, each of the servo motors outputting output torques in different or the same size or different or the same direction; the robot being in an idle state;
a2. applying an external force to drive the motor, such that two arms of at least one of joints of the robot being driven to move relatively through the external force; a time of applying the external force to drive the motor being regarded as a learning starting time to start counting, or a certain time before applying the external force to drive the robot being regarded as a learning starting time to start counting, the main controller recording learning output values of each of the encoders at each learning time every time t until stopping applying the external force;
b. resetting step: each of the servo motors being in a positional or speed mode via each of the drivers;
c. operating step:
the main controller controlling each of the servo motors to operate via each of the drivers; a time of driving each of servo motor via each of the drivers being regarded as an operation starting time to start counting, operational output values of each of the encoders at the operation starting time and each operation time every time z being equal to those of the encoder at the learning starting time and each learning time every time t.

The present invention also provides another method for manually teaching a robot at the same time.

A method for manually teaching a robot is disclosed, the robot comprises a main controller and at least one joint; the joint comprises two arms, a drive mechanism for driving the two arms to move relatively, the drive mechanism comprises a servo motor, a driver electrically connected to the drivers to control the servo motor, and an encoder; the main controller is electrically connected with each of the drivers, and an output of each of the encoders is connected to the main controller;

the method for manually teaching the robot comprises the following steps of:
a. learning step:
a1. each of the servo motors being in a torque mode via each of the drivers, each of the servo motors outputting output torques in different or the same size or different or the same direction; the robot being in an idle state;
a2. applying an external force to drive the motor, such that two arms of at least one of joints of the robot being driven to move relatively through the external force; the main controller recording learning output values of each of the encoders at a learning starting time or when each learning period going by in accordance with the following method until stopping applying the external force; a time of applying the external force to drive the motor being regarded as a learning starting time to start counting, or a certain time before applying the external force to drive the robot being regarded as a learning starting time to start counting, the main controller recording the learning output values at the learning starting time, and reading the learning output values of each of the encoders at each learning time at every time t; if an absolute value of a difference value between the learning output value at the next time and that at the prior time being greater than or equal to a set value, then the main controller recording the learning output values at the next time, and the learning period between the learning output values at the prior and next times; the learning output value at the next time being the learning output value when the learning period going by; if the absolute value of the difference value between the learning output value at the next time and that at the prior time being smaller than the set value, then the main controller doing not record the learning output value at the next time;

b. resetting step: each of the servo motors being in a positional or speed mode via each of the drivers;

c. operating step:

the main controller controlling each of the servo motors to operate via each of the drivers; a time of driving each of servo motor via each of the drivers being regarded as an operation starting time to start counting, operational output values of each of the encoders at the operation starting time or when each operation period going by being equal to those of the encoder at the learning starting time or when each learning period going by.

The present invention has the advantageous effects that: in the learning step, the robot enters into a torque mode with a low resistance and is driven by hand to move according to a desired track of the operator, the learning output values of each of the encoders go by change in the motion process of the robot, and the main controller stores the learning output values at each learning time or the learning output values when each learning period goes by. In the resetting step, the robot goes back to an initial speed state in the starting time, and each servo motor is in a positional or speed mode; in the operation step, each servo motor is controlled by each driver to operate, such that operational output values of each of the encoders every time z goes by change according to the stored learning output values every time t regularly, or such that the operational output values of each of the encoders when each operation period goes by change according to the stored learning output values when each learning period goes by. In this way, the operation of each joint is completely consistent with that of each joint in the learning step. In short, when teaching by this method, the robot is driven by hand to move according to the desired track of the operator, the robot system records the motion track. Upon operation, the robot moves according to the recorded teaching track. This simplifies the application and teaching way of the robot. The method does not need to be programmed for the operator, and the teaching track can be any track, without any requirement to the operator, so that the use cost of the robot is greatly reduced; and the parts used in the method belong to the conventional parts, so that the manufacturing cost is low.

The main controller records the encoder position (learning output value) in each joint in the learning step, so as to form the track data. The robot operates point by point at unit time during automatic operation. This method can avoid generating a great number of invalid data. Particularly, "a method for judging whether recording the learning output value at the next time according to the size of the absolute value of the difference value between the learning output value at the next time and that at the prior time," compared with the conventional method for recording the position on time, has more obvious advantage. If using the conventional method, a great number of recorded data would be generated in case of pausing or slowing moving during teaching to occupy resources and difficult to remove, which brings adverse effects for operation control.

The above method for manually teaching a robot further comprises the following steps of while performing the step a2 as well:

d1. the main controller comparing the learning output value of each of encoders recorded at the next time with that of each of encoders recorded at the prior time, judging a motion direction of one arm of each of joints relative to the other arm, and regarding the motion direction as a positive direction of the joint;

d2. if one arm of the joint trending to move along the positive direction relative to the other arm due to an output torque of the servo motor, then the main controller controlling the servo motor via the driver, such that the output torque of the servo motor being increased; if one arm relative to the other arm trending to move along a reverse direction reverse to the positive direction due to the output torque, then the main controller controlling the servo motor via the driver, such that the output torque of the servo motor being increased or the direction of the output torque being changed.

The step can enable the robot to be in an assistance mode in the learning step, which reduces the power as required to drive the robot by hand.

According to the method for manually teaching a robot, the time z is the times of the time t, or the operation period is the times of the learning period. The time z may be the integral multiple of the time t, or the operation period is the integral multiple of the learning period (at this time, the action of the robot in the operation step is slow than that in the learning step), the time t may also be the integral multiple of the time z, or the learning period is the integral multiple of the operation period (at this time, the action of the robot in the learning step is slow than that in the operation step).

According to the method for manually teaching a robot, the main controller is integrated with each driver.

According to the method for manually teaching a robot, the drive mechanism further comprises a reducer, an input shaft of the reducer is connected with an output shaft of the servo motor; a reducer housing and an engine base of the servo motor are fixed on an arm of one joint, and the output shaft of the reducer is connected to the other arm of the joint.

According to the method for manually teaching a robot, the robot at least comprises a first joint and a second joint; one of the two arms of the first joint is a fixed base, while the other thereof is a first arm moving relative to the fixed base; one of the two arms of the second joint is a first arm, while the other thereof is a second arm moving relative to the first arm.

According to the method for manually teaching a robot, the driving mechanism further comprises a nut-screw mechanism, a nut is fixed on one arm of the joint, a screw matched with the nut is connected with the output shaft of the servo motor; the engine base of the servo motor is fixed on the other arm of the joint; and the other arm is arranged on the nut of one arm of the joint in a sliding way in a direction parallel to the screw.

According to the method for manually teaching a robot, the driving mechanism further comprises a nut-screw mechanism, a nut is fixed on one arm of the joint, a screw matched with the nut is connected with the output shaft of the servo motor; the engine base of the servo motor is fixed on the other arm of the joint; and the other arm is arranged on the nut of one arm of the joint in a sliding way in a direction parallel to the screw.

The present invention further provides a manually taught robot, which has simple structure, is convenient to teach, and is convenient to operate.

A manually taught robot is disclosed, the robot comprises a main controller and at least one joint; the joint comprises two arms, a drive mechanism for driving the two arms to move relatively, the drive mechanism comprises a servo motor, a driver electrically connected to the drivers to control the servo motor, and an encoder; the main controller is electrically connected with each of the drivers, and an output of each of the encoders is connected to the main controller;

According to the manually taught robot, the drive mechanism further comprises a reducer, an input shaft of the reducer is connected with an output shaft of the servo motor; a reducer housing and an engine base of the servo motor are fixed on an arm of one joint, and the output shaft of the reducer is connected to the other arm of the joint.

According to the manually taught robot, the robot at least comprises a first joint and a second joint; one of the two arms of the first joint is a fixed base, while the other thereof is a first arm moving relative to the fixed base; one of the two arms of the second joint is a first arm, while the other thereof is a second arm moving relative to the first arm.

According to the manually taught robot, the driving mechanism further comprises a nut-screw mechanism, a nut is fixed on one arm of the joint, a screw matched with the nut is connected with the output shaft of the servo motor; the engine base of the servo motor is fixed on the other arm of the joint; and the other arm is arranged on the nut of one arm of the joint in a sliding way in a direction parallel to the screw.

According to the manually taught robot, the driving mechanism further comprises a nut-screw mechanism, a nut is fixed on one arm of the joint, a screw matched with the nut is connected with the output shaft of the servo motor; the engine base of the servo motor is fixed on the other arm of the joint; and the other arm is arranged on the nut of one arm of the joint in a sliding way in a direction parallel to the screw.

The manually taught robot has the advantageous effects that: during the process of using this robot to teach: in the learning step, the robot enters into a torque mode with a low resistance and is driven by hand to move according to a desired track of the operator, the learning output values of each of the encoders go by change in the motion process of the robot, and the main controller stores the learning output values. In the resetting step, the robot goes back to an initial speed state in the starting time, and each servo motor is in a positional or speed mode; in the operation step, each servo motor is controlled by each driver to operate, such that operational output values of each of the encoders goes by change according to the stored learning output values every time t regularly. In this way, the operation of each joint is completely consistent with that of each joint in the learning step. In short, the robot is driven by hand to move according to the desired track of the operator, the robot system records the motion track. Upon operation, the robot moves according to the recorded teaching track. This simplifies the application and teaching way of the robot. The method does not need to be programmed for the operator, and the teaching track can be any track, without any requirement to the operator, so that it is convenient to operate; and the parts used in the robot belong to the conventional parts, so that the manufacturing cost is low.

DETAILED DESCRIPTION

Figure 1:
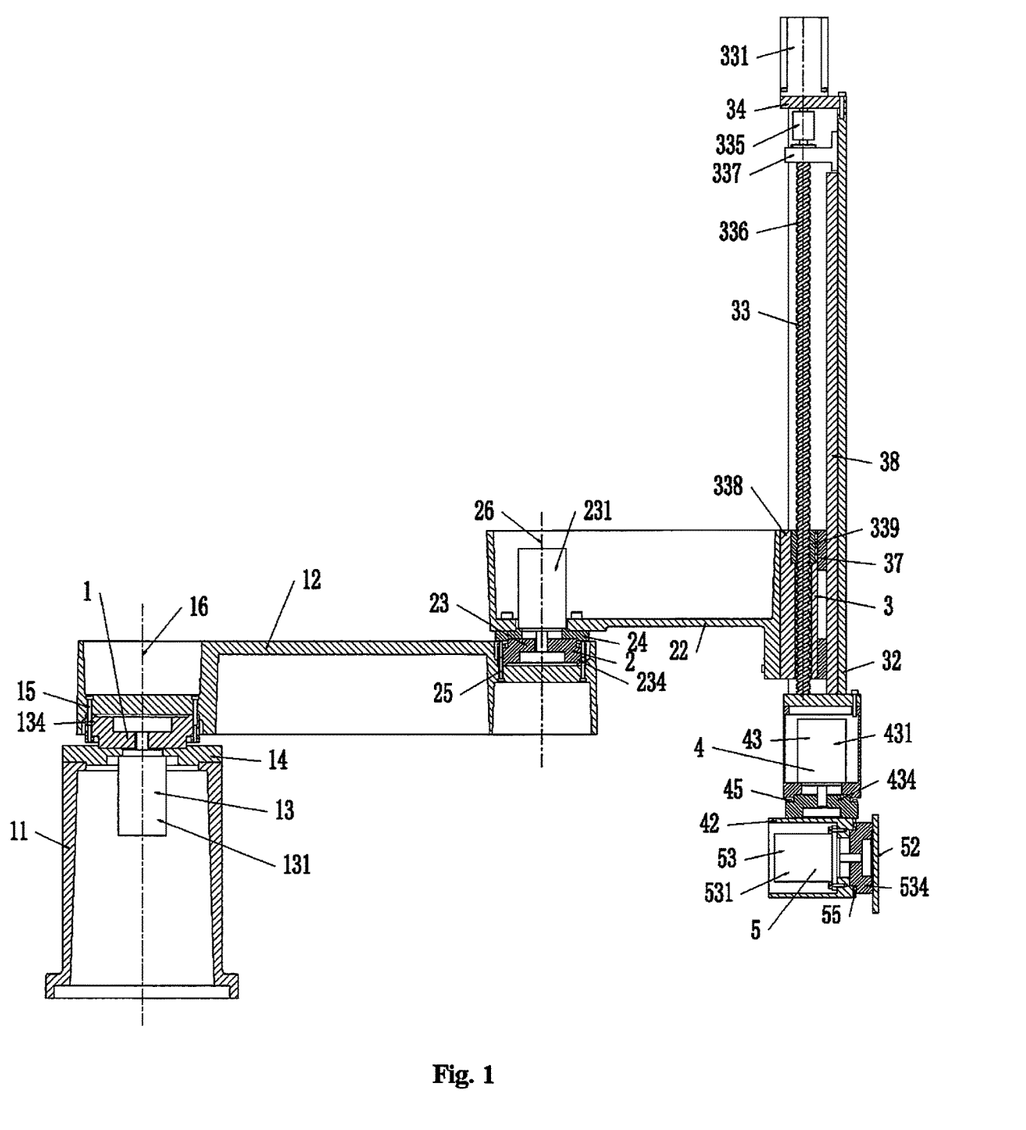
FIG. 1 is a structural schematic drawing of a joint of a robot.

A robot as shown in FIG. 1 comprises 5 joints 1-5.

The robot 1 comprises a fixed base as an arm 11, an arm 12, a drive mechanism 13 driving the arm 12 to rotate relative to the fixed base, and a flange plate 14, etc. The drive mechanism 13 comprises a servo motor 131, a driver 132 electrically connected to the servo motor to control the servo motor, an encoder 133 connected to the servo motor 131, and a reducer 134. The flange plate 14 is fixed on the arm (fixed base) 11, and shells of both servo motor 131 and the reducer 134 are fixed on the flange plate 14. An input shaft of the reducer 134 is connected with an output shaft of the servo motor 131; and an output shaft of the reducer 134 is connected with the arm 12 via a bolt 15. The servo motor 131 acts, and drives the arm 13 via the reducer 134 to rotate in a horizontal plane around an axis 16 relative to the fixed base 11.

The joint 2 comprises an arm 12, an arm 22, a drive mechanism 23 driving the arm 12 and the arm 22 to rotate relatively, and a flange plate 24, etc. The drive mechanism 23 comprises a servo motor 231, a driver 232 electrically connected to the servo motor to control the servo motor, an encoder 233 connected to the servo motor 231, and a reducer 234. The flange plate 24 is fixed on the arm 22, and shells of both servo motor 231 and the reducer 234 are fixed on the flange plate 24. An input shaft of the reducer 234 is connected with an output shaft of the servo motor 231; and an output shaft of the reducer 234 is connected with the arm 12 via a bolt 25. The servo motor 231 acts, and drives the arm 22 via the reducer 234 to rotate in a horizontal plane around an axis 26 relative to the fixed base 12.

The joint 3 comprises an arm 22, an arm 32, a drive mechanism 33 driving the arm 32 to move up and down relative to the arm 22, a motor support 34, and a wire track, etc. The drive mechanism 33 comprises a servo motor 331, a driver 332 electrically connected to the servo motor to control the servo motor, an encoder 333 connected to the servo motor 331, a coupling 335, and a nut-screw mechanism, etc. The nut-screw mechanism comprises a screw 336 rotatably arranged on a screw base 337, a sliding block base 338 fixed on the arm 22, and a nut 339 matched with the screw and fixed on the sliding block base 338, etc. The wire track comprises a wire track sliding block 37 arranged on the sliding block base, and a guide rail 38 slid with the wire track up and down. Both the motor support 34 and the screw base are fixed on the arm 32, and the arm 32 is fixed with the guide rail. The servo motor 331 acts, and drives the screw by the coupling to rotate. As the nut is fixed on the arm via the sliding block, the screw moves up and down relative to the nut while rotating. When the screw moves up and down, the screw base, the servo motor 333, the arm 32, and the guide rail move up and down relative to the sliding block base (and arm 22). The wire track is arranged between the sliding block base and the arm 32, guiding the arm to move up and down.

The joint 4 mainly comprises an arm 32, an arm 42, and a drive mechanism 43 driving the arm 42 to rotate relative to the arm 32, etc. The drive mechanism 43 comprises a servo motor 431, a driver 432 electrically connected to the servo motor to control the servo motor, an encoder 433 connected to the servo motor 431, and a reducer 434. The shells of both servo motor 431 and the reducer 434 are fixed on the arm 32. An input shaft of the reducer 434 is connected with an output shaft of the servo motor 431; and an output shaft of the reducer 434 is connected with the arm 42 via a bolt 45. The servo motor 431 acts, and drives the arm 42 via the reducer 434 to rotate in a horizontal plane around an axis relative to the fixed base 32.

The joint 5 mainly comprises an arm 42, an arm 52, and a drive mechanism 53 driving the arm 52 to rotate relative to the arm 42, etc. The drive mechanism 53 comprises a servo motor 531, a driver 532 electrically connected to the servo motor to control the servo motor, an encoder 533 connected to the servo motor 531, and a reducer 534. The shells of both servo motor 531 and the reducer 534 are fixed on the arm 42. An input shaft of the reducer 534 is connected with an output shaft of the servo motor 531; and an output shaft of the reducer 534 is connected with the arm 52 via a bolt 55. The servo motor 531 acts, and drives the arm 52 via the reducer 534 to rotate in a vertical plane around an axis relative to the fixed base 42.

Figure 2:
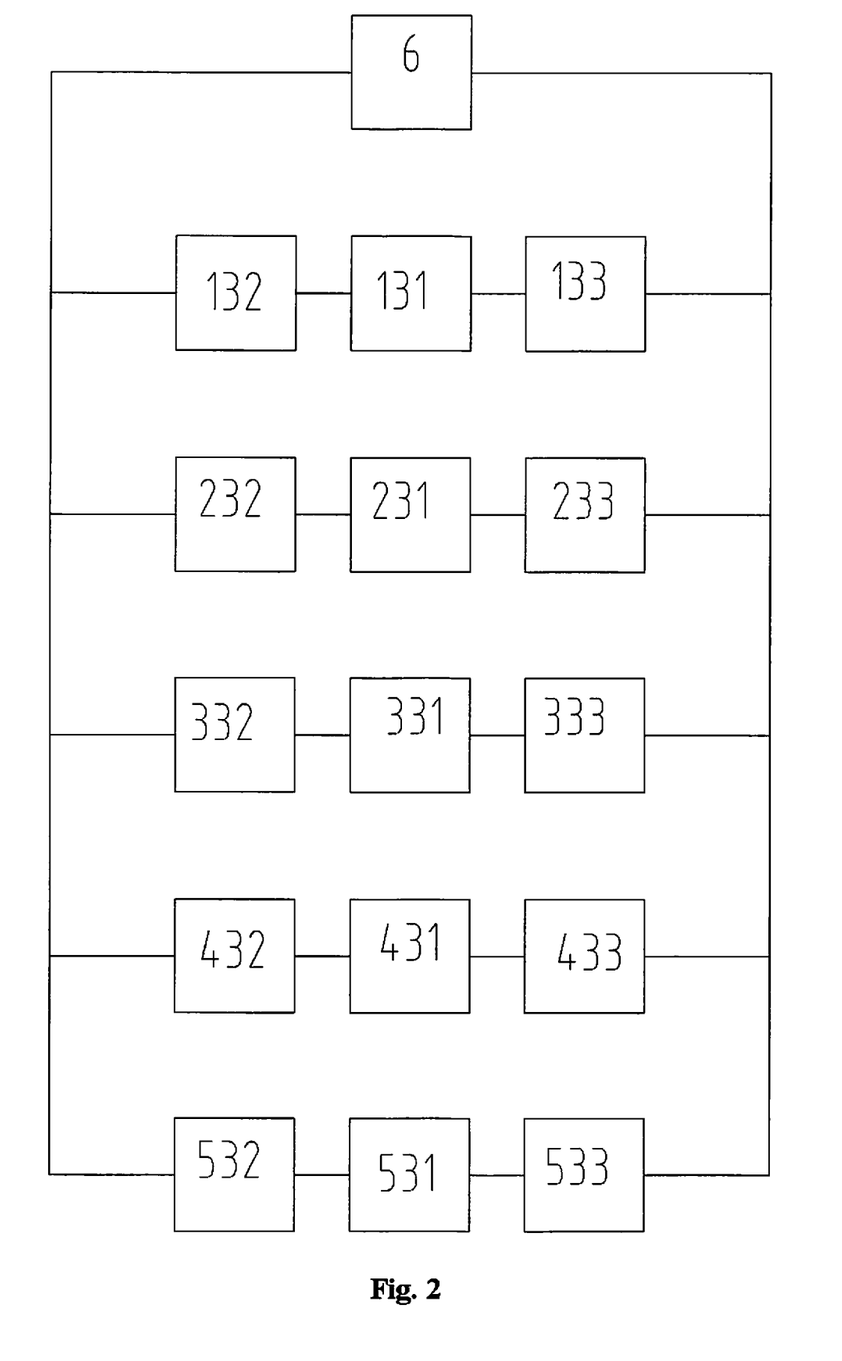
FIG. 2 is a functional block diagram of a main controller, a servo motor or the like of the robot.

Referring to FIG. 2, the main driver 6 is electrically connected to the drivers 132, 232, 332, 432 and 532, and outputs of the encoders 133, 233, 333, 433 and 533 are connected to the main controller.

Figure 3:
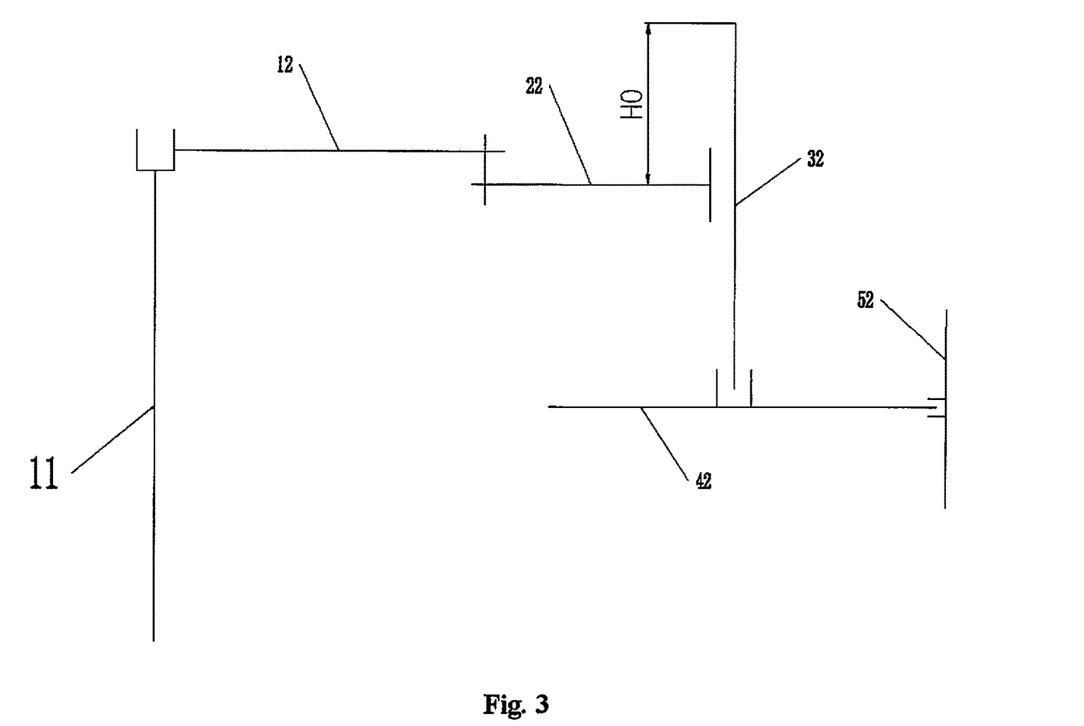
FIG. 3 is a schematic diagram of the joint of the robot at the learning starting time.
Figure 4:
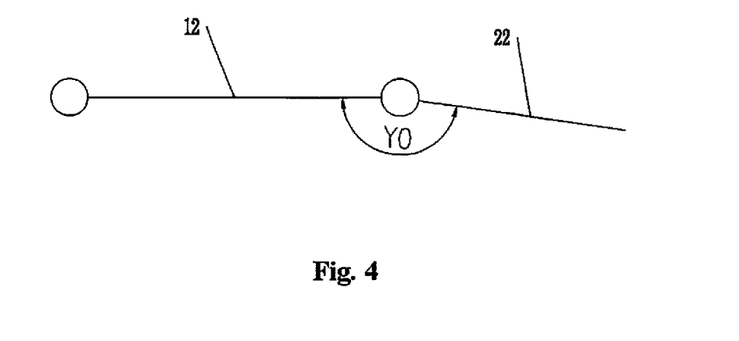
FIG. 4 is a top schematic diagram of the joints 1 and 2 at the learning starting time.
Figure 5:
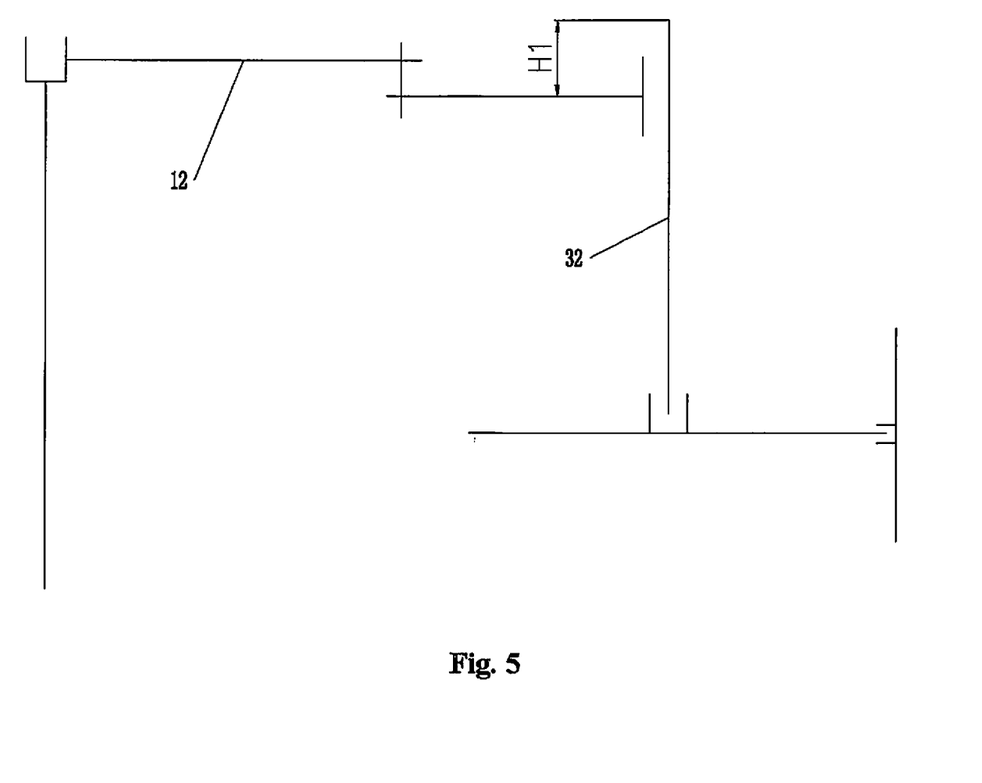
FIG. 5 is a schematic diagram of the joint of the robot at the learning ending time.
Figure 6:
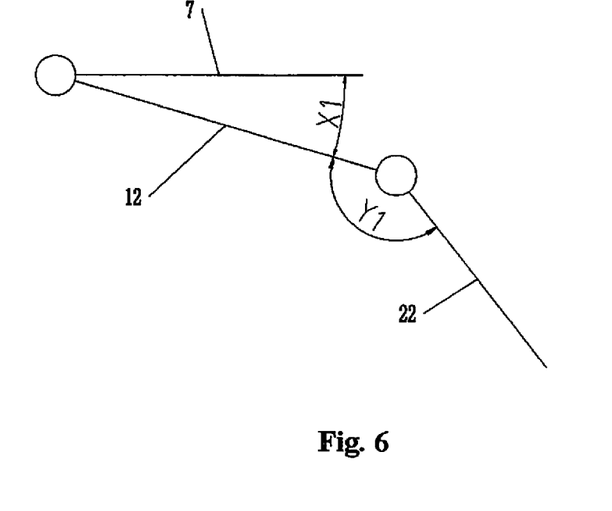
FIG. 6 is a top schematic diagram of the joints 1 and 2 at the learning ending time.

Embodiment 1:

The first method for manually teaching a robot comprises the following steps of:

a. learning step:

a1. Each of the servo motor is in a torque mode via each of the drivers, it is supposed that the servo motor 131 outputs an output torque n1 which enables the arm 12 to have a tendency to rotate counterclockwise on the horizontal plane with respect to the arm 11, the servo motor 231 outputs an output torque n2 which enables the arm 22 to have a tendency to rotate clockwise on the horizontal plane with respect to the arm 12; the servo motor 331 outputs an output torque n3 which enables the arm 32 to have a tendency to move upward on the vertical plane with respect to the arm 22; the servo motor 431 outputs an output torque n4 which enables the arm 42 to have a tendency to rotate counterclockwise on the horizontal plane with respect to the arm 31, and the servo motor 531 output an output torque n5 which enables the arm 52 to have a tendency to rotate clockwise on the vertical plane with respect to the arm 42; and the robot is in an idle state.

a2. The robot is driven by hand. It is supposed that, upon driving, the joints 1, 2 and 3 act (which means that two arms in a certain joint move relatively), the joints 4 and 5 do not act (which means that two arms in a certain joint do not move relatively). The time of driving the robot by hand is regarded as the learning starting time to start counting, the main controller records the learning output values of each of the encoders at each learning time every time 1 s until stopping applying the external force, the duration is totally 5s. Referring to FIG. 3 and FIG. 4, at 0 s of starting counting (learning starting time), an included angle between the arm 12 and the vertical plane 7 is 0, an included angle between arm 22 and the arm 12 is Y0, and a height of the top end of the arm 32 higher than the horizontal plane at which the arm 22 is located is H0. Referring to FIG. 5 and FIG. 6, after 5s (learning ending time), an included angle between the arm 12 and the vertical Plane 7 is X1, an included angle between arm 22 and the arm 12 in the horizontal plane is Y1, and a height of the top end of the arm 32 higher than the horizontal plane at which the arm 22 is located is H1.

TABLE 1

(each learning time, learning output values of each encoder):

| Time | 0 s | 1 s | 2 s | 3 s | 4 s | 5 s |
| --- | --- | --- | --- | --- | --- | --- |
| Encoder 133 | 0 | 1 | 2 | 3 | 5 | 8 |
| Encoder 233 | 0 | 2 | 3 | 5 | 5 | 9 |
| Encoder 333 | 0 | 0.3 | 0.4 | 0.6 | 0.9 | 1.2 |
| Encoder 433 | 0 | 0 | 0 | 0 | 0 | 0 |
| Encoder 533 | 0 | 0 | 0 | 0 | 0 | 0 |

In table 1, as the joints 4 and 5 do not act, the learning output values of the encoders 433 and 533 remain unchanged.

With regard to the joint 1, the learning output value of the encoder 133 recorded by the main controller is gradually increased (referring to table 1), the arm 12 always rotates clockwise with respect to the vertical plane 7. As the output torque n1 of the servo motor 131 enables the arm 12 to have the tendency to rotate counterclockwise on the horizontal plane with respect to the arm 11, the main controller controls the servo motor 131 via the driver 132 during the learning step process, so that the output torque n1 of the servo motor 131 is reduced, or the direction of the output torque n1 is changed, to have assistance to operate the robot by hand.

With regard to the joint 2, the learning output value of the encoder 233 recorded by the main controller is gradually increased (referring to table 1), the arm 22 always rotates clockwise with respect to the arm 12. As the output torque n2 of the servo motor 231 enables the arm 22 to have the tendency to rotate clockwise on the horizontal plane with respect to the arm 12, the main controller controls the servo motor 231 via the driver 232 during the learning step process, so that the output torque n2 of the servo motor 231 is increased, to have assistance to operate the robot by hand.

With regard to the joint 3, the learning output value of the encoder 333 recorded by the main controller is gradually increased (referring to table 1), the arm 32 is kept reducing with respect to the arm 22. As the output torque n3 of the servo motor 331 enables the arm 32 to have the tendency to move upward on the vertical plane with respect to the arm 22, the main controller controls the servo motor 331 via the driver 332 during the learning step process, so that the output torque n3 of the servo motor 331 is reduced, or the direction of the output torque n3 is changed, to have assistance to move the arm 32.

With regard to the joints 4 and 5, the learning output values of the encoders 433 and 533 recorded by the main controller remain unchanged (referring to table 1), and both the size and the direction of the output torques n4 and n5 of the servo motors 431 and 531 remain unchanged.

b. resetting step: each of the servo motors is in the positional or speed mode via each of the drivers; each of the servo motors acts, such that the robot returns to the state at the starting time, in other words, the relative position of the two arms in each joint returns to the state at the learning starting time.

c. operating step:

The main controller controls each of the servo motors to operate via each of the drivers; the time of driving each of servo motor via each of the drivers is regarded as an operation starting time to start counting, the main controller controls the operational output values of each of the encoders at the operation starting time and each operation time every time 2s; the operational output values of each of the encoders at the operation starting time and each operation time every time 2s are as shown in table 2 (and is equal to the learning output value of the encoder at the learning starting time and each learning time every time t).

TABLE 2

(each operation time, operational output values of each encoder):

| Time | 0 s | 2 s | 4 s | 6 s | 8 s | 10 s |
|---|---|---|---|---|---|---|
| Encoder 133 | 0 | 1 | 2 | 3 | 5 | 8 |
| Encoder 233 | 0 | 2 | 3 | 5 | 5 | 9 |
| Encoder 333 | 0 | 0.3 | 0.4 | 0.6 | 0.9 | 1.2 |
| Encoder 433 | 0 | 0 | 0 | 0 | 0 | 0 |
| Encoder 533 | 0 | 0 | 0 | 0 | 0 | 0 |

Embodiment 2:

The second method for manually teaching a robot comprises the following steps of:

a. learning step:

a1. Each of the servo motor is in a torque mode via each of the drivers, it is supposed that the servo motor 131 outputs an output torque n1 which enables the arm 12 to have a tendency to rotate counterclockwise on the horizontal plane with respect to the arm 11, the servo motor 231 outputs an output torque n2 which enables the arm 22 to have a tendency to rotate clockwise on the horizontal plane with respect to the arm 12; the servo motor 331 outputs an output torque n3 which enables the arm 32 to have a tendency to move upward on the vertical plane with respect to the arm 22; the servo motor 431 outputs an output torque n4 which enables the arm 42 to have a tendency to rotate counterclockwise on the horizontal plane with respect to the arm 31, and the servo motor 531 output an output torque n5 which enables the arm 52 to have a tendency to rotate clockwise on the vertical plane with respect to the arm 42; and the robot is in a static state.

a2. The robot is driven by hand. It is supposed that, upon driving, the joints 1, 2 and 3 act (which means that two arms in a certain joint move relatively), the joints 4 and 5 do not act (which means that two arms in a certain joint do not move relatively). The time of driving the robot by hand is regarded as the learning starting time to start counting, the learning output values of each of the encoders at each learning time every 1s is as shown in table 3. In table 3, as the joints 4 and 5 do not act, the learning output values of the encoders 433 and 533 remain unchanged. It is supposed that, with regard to the encoders 133, 233, 333, 433 and 533, the set values set by the main controller to start recording the relevant data are 0.4, 0.3, 0.2, 0.3 and 0.3 respectively.

Now, the joint 1 is taken as an example for description. The main controller of the encoder 133 records the learning output value 0 at the learning starting time (0s) at first, and then reads the learning output value at each learning time every 1s. With regard to the 1s, the learning output value of the encoder 133 is 1. As the absolute value of the difference value between the learning output value 1 at 1s and the learning output value 0 at 0s is 1, which is greater than the set value 0.4 of the relevant data recorded at the beginning, the main controllers records the learning output value 1 at 1s and the learning period 1s between the learning output values recorded at the prior and next times. As the absolute value of the difference value between the learning output value 1.2 at 2s and the learning output value 1 at 1s is 0.2, which is smaller than the set value 0.4 of the relevant data recorded at the beginning, the main controller does not record the learning output value at 2s. Similarly, as the absolute value of the difference value between the learning output value 1.3 at 3s and the learning output value 1.2 at 2s is 0.1, which is smaller than the set value 0.4 of the relevant data recorded at the beginning, the main controller does not record the learning output value at 3s. As the absolute value of the difference value between the learning output value 5 at 4s and the learning output value 1.3 at 3s is 3.7, which is greater than the set value 0.4 of the relevant data recorded at the beginning, the main controllers records the learning output value 5 at 4s and the learning period 3s between the learning output values recorded at the prior and next times (the learning output value recorded at 4s and the learning output value recorded at 1s). As the absolute value of the difference value between the learning output value 8 at 5s and the learning output value 5 at 4s is 3, which is greater than the set value 0.4 of the relevant data recorded at the beginning, the main controllers records the learning output value 8 at 5s and the learning period 1s between the learning output values recorded at the prior and next times (the learning output value recorded at 5s and the learning output value recorded at 4s). With regard to the joint 1, the learning output values at the learning period or when the learning period goes by recorded by the main controller are as shown in table 4.

In the same way, with regard to the joints 2-5, the learning output values at the learning period or when the learning period goes by recorded by the main controller are as shown in tables 5-8. In tables 4-8, the learning period 0s indicates the learning starting time.

Referring to FIG. 3 and FIG. 4, at 0s of starting counting (learning starting time), an included angle between the arm 12 and the vertical plane 7 is 0, an included angle between arm 22 and the arm 12 is 0, and a height of the top end of the arm 32 higher than the horizontal plane at which the arm 22 is located is 0. Referring to FIG. 5 and FIG. 6, after 5 s (learning ending time), an included angle between the arm 12 and the vertical plane 7 is X1, an included angle between arm 22 and the arm 12 in the horizontal plane is Y1, and a height of the top end of the arm 32 higher than the horizontal plane at which the arm 22 is located is H1.

TABLE 3

(each learning time, learning output values of each encoder):

| Time | 0 s | 1 s | 2 s | 3 s | 4 s | 5 s |
|---|---|---|---|---|---|---|
| Encoder 133 | 0 | 1 | 1.2 | 1.3 | 5 | 8 |
| Encoder 233 | 0 | 2 | 3 | 3.1 | 5 | 9 |
| Encoder 333 | 0 | 0.3 | 0.4 | 0.6 | 0.9 | 1.2 |
| Encoder 433 | 0 | 0 | 0 | 0 | 0 | 0 |
| Encoder 533 | 0 | 0 | 0 | 0 | 0 | 0 |

TABLE 4

| Learning period | 0 s | 1 s | 3 s | 1 s |
|---|---|---|---|---|
| Encoder 133 | 0 | 1 | 5 | 8 |

TABLE 5

| Learning period | 0 s | 1 s | 1 s | 2 s | 1 s |
|---|---|---|---|---|---|
| Encoder 233 | 0 | 2 | 3 | 5 | 9 |

TABLE 6

| Learning period | 0 s | 1 s | 2 s | 1 s | 1 s |
|---|---|---|---|---|---|
| Encoder 333 | 0 | 0.3 | 0.6 | 0.9 | 1.2 |

TABLE 7

| Learning period | 0 s |
|---|---|
| Encoder 433 | 0 |

TABLE 8

| Learning period | 0 s |
|---|---|
| Encoder 533 | 0 |

TABLE 9

| Operation period | 0 s | 0.5 s | 1.5 s | 0.5 s |
|---|---|---|---|---|
| Encoder 133 | 0 | 1 | 5 | 8 |

TABLE 10

| Operation period | 0 s | 0.5 s | 0.5 s | 1 s | 0.5 s |
|---|---|---|---|---|---|
| Encoder 233 | 0 | 2 | 3 | 5 | 9 |

TABLE 11

| Operation period | 0 s | 0.5 s | 1 s | 0.5 s | 0.5 s |
|---|---|---|---|---|---|
| Encoder 333 | 0 | 0.3 | 0.6 | 0.9 | 1.2 |

TABLE 12

| Operation period | 0 s |
|---|---|
| Encoder 433 | 0 |

TABLE 13

| Operation period | 0 s |
|---|---|
| Encoder 533 | 0 |

With regard to the joint 1, the learning output value of the encoder 133 recorded by the main controller is gradually increased (referring to table 4). The arm 12 always rotates clockwise with respect to the vertical plane 7. As the output torque n1 of the servo motor 131 enables the arm 12 to have the tendency to rotate counterclockwise on the horizontal plane with respect to the arm 11, the main controller controls the servo motor 131 via the driver 132 during the learning step process, so that the output torque n1 of the servo motor 131 is reduced, or the direction of the output torque n1 is changed, to have assistance to the manually operated robot.

With regard to the joint 2, the learning output value of the encoder 233 recorded by the main controller is gradually increased (referring to table 5). The arm 22 always rotates clockwise with respect to the arm 12. As the output torque n2 of the servo motor 231 enables the arm 22 to have the tendency to rotate clockwise on the horizontal plane with respect to the arm 12, the main controller controls the servo motor 231 via the driver 232 during the learning step process, so that the output torque n2 of the servo motor 231 is increased, to have assistance to the manually operated robot.

With regard to the joint 3, the learning output value of the encoder 333 recorded by the main controller is gradually increased (referring to table 6), the arm 32 is kept reducing with respect to the arm 22. As the output torque n3 of the servo motor 331 enables the arm 32 to have the tendency to move upward on the vertical plane with respect to the arm 22, the main controller controls the servo motor 331 via the driver 332 during the learning step process, so that the output torque n3 of the servo motor 331 is reduced, or the direction of the output torque n3 is changed, to have assistance to move the arm 32.

With regard to the joints 4 and 5, the learning output values of the encoders 433 and 533 recorded by the main controller remain unchanged (referring to table 7 and table 8), and both the size and the direction of the output torques n4 and n5 of the servo motors 431 and 531 remain unchanged.

b. resetting step: each of the servo motors is in the positional or speed mode via each of the drivers; each of the servo motors acts, such that the robot returns to the state at the starting time, in other words, the relative position of the two arms in each joint returns to the state at the learning starting time.

c. operating step:

the main controller controlling each of the servo motors in each joint to operate via each of the drivers; a time of driving each of servo motor via each of the drivers being regarded as an operation starting time to start counting, operational output values of each of the encoders at the operation starting time or when each operation period going by being equal to those of the encoder at the learning starting time or when each learning period going by. If the learning period doubles the corresponding operation period, the corresponding table of the learning output value at each operation period or when each operation period goes by is as shown in tables 9-13.

What is claimed is:

1. A method for manually teaching a robot is disclosed, the robot comprises a main controller and at least one joint; the joint comprises two arms, a drive mechanism for driving the two arms to move relatively, the drive mechanism comprises a servo motor, a driver electrically connected to the drivers to control the servo motor, and an encoder; the main controller is electrically connected with each of the drivers, and an output of each of the encoders is connected to the main controller;

the method for manually teaching the robot comprises the following steps of:

a. learning step:

a1. each of the servo motors being in a torque mode via each of the drivers, each of the servo motors outputting output torques in different or the same size or different or the same direction; the robot being in an idle state;

a2. applying an external force to drive the motor, such that two arms of at least one of joints of the robot being driven to move relatively through the external force; a time of applying the external force to drive the motor being regarded as a learning starting time to start counting, or a certain time before applying the external force to drive the robot being regarded as a learning starting time to start counting, the main controller recording learning output values of each of the encoders at each learning time every time t until stopping applying the external force;

b. resetting step: each of the servo motors being in a positional or speed mode via each of the drivers;

c. operating step:

the main controller controlling each of the servo motors to operate via each of the drivers; a time of driving each of servo motor via each of the drivers being regarded as an operation starting time to start counting, operational output values of each of the encoders at the operation starting time and each operation time every time z being equal to those of the encoder at the learning starting time and each learning time every time t.

2. The method for manually teaching a robot according to claim 1, wherein the time z is times of the time t.

3. A method for manually teaching a robot is disclosed, the robot comprises a main controller and at least one joint; the joint comprises two arms, a drive mechanism for driving the two arms to move relatively, the drive mechanism comprises a servo motor, a driver electrically connected to the drivers to control the servo motor, and an encoder; the main controller is electrically connected with each of the drivers, and an output of each of the encoders is connected to the main controller;

the method for manually teaching the robot comprises the following steps of:

a. learning step:

a1. each of the servo motors being in a torque mode via each of the drivers, each of the servo motors outputting output torques in different or the same size or different or the same direction; the robot being in an idle state;

a2. applying an external force to drive the motor, such that two arms of at least one of joints of the robot being driven to move relatively through the external force; the main controller recording learning output values of each of the encoders at a learning starting time or when each learning period going by in accordance with the following method until stopping applying the external force; a time of applying the external force to drive the motor being regarded as a learning starting time to start counting, or a certain time before applying the external force to drive the robot being regarded as a learning starting time to start counting, the main controller recording the learning output values at the learning starting time, and reading the learning output values of each of the encoders at each learning time at every time t; if an absolute value of a difference value between the learning output value at the next time and that at the prior time being greater than or equal to a set value, then the main controller recording the learning output values at the next time, and the learning period between the learning output values at the prior and next times; the learning output value at the next time being the learning output value when the learning period going by; if the absolute value of the difference value between the learning output value at the next time and that at the prior time being smaller than the set value, then the main controller doing not record the learning output value at the next time;

b. resetting step: each of the servo motors being in a positional or speed mode via each of the drivers;

c. operating step:

the main controller controlling each of the servo motors to operate via each of the drivers; a time of driving each of servo motor via each of the drivers being regarded as an operation starting time to start counting, operational output values of each of the encoders at the operation starting time or when each operation period going by being equal to those of the encoder at the learning starting time or when each learning period going by.

4. The method for manually teaching a robot according to claim 3, wherein the operation period is times of the learning period.

5. The method for manually teaching a robot according to claim 1, further comprising the following steps of, while performing the step a2:

d1. the main controller comparing the learning output value of each of encoders recorded at the next time with that of each of encoders recorded at the prior time, judging a motion direction of One arm of each of joints relative to the other arm, and regarding the motion direction as a positive direction of the joint;

d2. if one arm of the joint trending to move along the positive direction relative to the other arm due to an output torque of the servo motor, then the main controller controlling the servo motor via the driver, such that the output torque of the servo motor being increased; if one arm relative to the other arm trending to move along a reverse direction reverse to the positive direction due to the output torque, then the main controller controlling the servo motor via the driver, such that the output torque of the servo motor being increased or the direction of the output torque being changed.

6. The method for manually teaching a robot according to claim 3, wherein the external force refers to an arm power of a person.

7. The method for manually teaching a robot according to claim 3, wherein the drive mechanism further comprises a reducer, an input shaft of the reducer is connected with an output shaft of the servo motor; a reducer housing and an engine base of the servo motor are fixed on an arm of one joint, and the output shaft of the reducer is connected to the other arm of the joint.

8. The method manually teaching a robot according to claim 6, wherein the robot at least comprises a first joint and a second joint; one of the two arms of the first joint is a fixed base, while the other thereof is a first arm moving relative to the fixed base; one of the two arms of the second joint is a first arm, while the other thereof is a second arm moving relative to the first arm.

9. The method for manually teaching a robot according to claim 1, wherein the driving mechanism further comprises a nut-screw mechanism, a nut is fixed on one arm of the joint, a screw matched with the nut is connected with the output shaft of the servo motor; the engine base of the servo motor is fixed on the other arm of the joint; and the other arm is arranged on the nut of one arm of the joint in a sliding way in a direction parallel to the screw.

10. The method for manually teaching a robot according to claim 1, wherein the driving mechanism further comprises a gear-rack mechanism, racks are fixed one arm of the joint, a gear matched with the racks is connected with the output shaft of the servo motor; the engine base of the servo motor is fixed on the other arm of the joint; and the other arm is arranged on one arm of the joint in a sliding way in a direction parallel to the racks.

11. The method for manually teaching a robot according to claim 3, further comprising the following steps of, while performing the step a2:
   d1. the main controller comparing the learning output value of each of encoders recorded at the next time with that of each of encoders recorded at the prior time, judging a motion direction of one arm of each of joints relative to the other arm, and regarding the motion direction as a positive direction of the joint;
   d2. if one arm of the joint trending to move along the positive direction relative to the other arm due to an output torque of the servo motor, then the main controller controlling the servo motor via the driver, such that the output torque of the servo motor being increased; if one arm relative to the other arm trending to move along a reverse direction reverse to the positive direction due to the output torque, then the main controller controlling the servo motor via the driver, such that the output torque of the servo motor being increased or the direction of the output torque being changed.

12. The method for manually teaching a robot according to claim 3, wherein the drive mechanism further comprises a reducer, an input shaft of the reducer is connected with an output shaft of the servo motor; a reducer housing and an engine base of the servo motor are fixed on an arm of one joint, and the output shaft of the reducer is connected to the other arm of the joint.

13. The method manually teaching a robot according to claim 11, wherein the robot at least comprises a first joint and a second joint; one of the two arms of the first joint is a fixed base, while the other thereof is a first arm moving relative to the fixed base; one of the two arms of the second joint is a first arm, while the other thereof is a second arm moving relative to the first arm.

14. A manually taught robot, the robot comprises a main controller and at least one joint, wherein the joint comprises two arms, a drive mechanism for driving the two arms to move relatively, the drive mechanism comprises a servo motor, a driver electrically connected to the servo motor to control the servo motor and an encoder; the main controller is electrically connected with each of the drivers, and an output of each of the encoders is connected to the main controller.

15. The manually taught robot according to claim 14, wherein the drive mechanism further comprises a reducer, an input shaft of the reducer is connected with an output shaft of the servo motor; a reducer housing and an engine base of the servo motor are fixed on an arm of one joint, and the output shaft of the reducer is connected to the other arm of the joint.

16. The manually taught robot according to claim 15, wherein the robot at least comprises a first joint and a second joint; one of the two arms of the first joint is a fixed base, while the other thereof is a first arm moving relative to the fixed base; one of the two arms of the second joint is a first arm, while the other thereof is a second arm moving relative to the first arm.

* * * * *